(12) United States Patent
Fouillet et al.

(10) Patent No.: US 7,207,348 B2
(45) Date of Patent: Apr. 24, 2007

(54) MACHINE COMPRISING A SAFETY VALVE FOR THE SUPPLY OF PRESSURISED FLUID

(75) Inventors: Jean-Pierre Fouillet, Champigny (FR); Sébastien Pereira Santo, Nogent sur Marne (FR)

(73) Assignee: Recoules S.A., Ozoir-la-Ferriere (FR)

( * ) Notice: Subject to any disclaimer, the term of this patent is extended or adjusted under 35 U.S.C. 154(b) by 243 days.

(21) Appl. No.: 10/754,695

(22) Filed: Jan. 12, 2004

(65) Prior Publication Data

US 2004/0163531 A1 Aug. 26, 2004

(30) Foreign Application Priority Data

Jan. 14, 2003 (FR) ................... 03 00363

(51) Int. Cl.
*F16K 31/143* (2006.01)

(52) U.S. Cl. ................. 137/495; 137/466; 137/505.42; 251/321; 251/339

(58) Field of Classification Search ............... 137/464, 137/495, 466, 505.42; 222/402.21, 402.22, 222/402.23, 402.24, 402.25; 251/319–325, 251/339
See application file for complete search history.

(56) References Cited

U.S. PATENT DOCUMENTS

| | | | | |
|---|---|---|---|---|
| 432,459 A * | 7/1890 | Walda | ............... | 137/382 |
| 760,595 A * | 5/1904 | Wiesebrock | ............... | 137/488 |
| 1,312,644 A * | 8/1919 | Raab et al. | ............... | 137/464 |
| 1,343,951 A * | 6/1920 | Whyte | ............... | 251/321 |
| 2,096,785 A * | 10/1937 | Carter | ............... | 137/465 |
| 2,598,417 A * | 5/1952 | Niemann | ............... | 251/303 |
| 2,962,044 A * | 11/1960 | Charboneau | ............... | 137/456 |
| 3,231,236 A * | 1/1966 | Hodel et al. | ............... | 251/324 |
| 3,678,959 A * | 7/1972 | Liposky | ............... | 137/625.11 |
| 3,792,714 A * | 2/1974 | Miller | ............... | 137/494 |
| 4,080,987 A * | 3/1978 | Fogg | ............... | 137/464 |
| 4,085,772 A * | 4/1978 | Roger | ............... | 137/464 |
| 4,650,377 A | 3/1987 | Biek | | |
| 4,700,742 A * | 10/1987 | Rosaen | ............... | 137/557 |
| 4,813,492 A * | 3/1989 | Biek | ............... | 173/2 |
| 5,860,446 A * | 1/1999 | Hunt | ............... | 137/464 |
| 5,876,041 A | 3/1999 | Kuckelsberg et al. | | |
| 5,944,054 A * | 8/1999 | Saieva | ............... | 137/625.4 |
| 6,478,046 B2 * | 11/2002 | Gabrel | ............... | 137/505.42 |
| 6,679,053 B2 * | 1/2004 | Priese | ............... | 60/403 |

FOREIGN PATENT DOCUMENTS

| | | |
|---|---|---|
| DE | 268 228 | 11/1911 |
| DE | 10 47 561 | 12/1958 |
| GB | 2 191 270 | 12/1987 |
| GB | 2 366 830 | 3/2002 |

* cited by examiner

*Primary Examiner*—Eric Keasel
*Assistant Examiner*—Craig Schneider
(74) *Attorney, Agent, or Firm*—Young & Thompson

(57) ABSTRACT

The safety valve comprises a body and an obturator movable in the body between a closed position (FIG. 2) and an open position (FIG. 3). It also comprises means for displacing the obturator in order to displace it towards its closed position when the pressure of the fluid is lower than a threshold value, and the displacement means comprise:
  a piston for driving the obturator towards its open position, the piston being in contact with the pressurised fluid when the obturator is in the open position, and means for returning the obturator towards its closed position.

Application, for example, to pneumatic machining machines.

10 Claims, 3 Drawing Sheets

MACHINE COMPRISING A SAFETY VALVE FOR THE SUPPLY OF PRESSURISED FLUID

TECHNICAL FIELD

The present invention relates to a safety valve for supplying pressurised fluid to a machine, the valve being of the type comprising a body and an obturator which is movable in the body between a closed position and an open position.

BACKGROUND TO THE INVENTION

The invention is applicable especially to the supply of machining machines, for example portable drilling machines having pneumatic motors.

Such a machine is connected to a source of compressed air, for example via a tube, and generally comprises a rotary spindle carrying a drilling tool.

If there is a drop in pressure upstream of the machine when it is in operation, for example as a result of the formation of a kink in the tube, the pneumatic motor no longer drives the drilling tool.

When there is a later rise in pressure, for example when the kink is removed from the tube, the tool may in some machines be driven again inadvertently by the motor.

It will be appreciated that this involves risks of injury to an operator using the drilling machine.

Safety electrovalves which are used to equip circuits for the supply of compressed air are also known. Such an electrovalve is controlled as a function of signals supplied by a pressure sensor outside the valve in order to trigger its closure when the pressure falls below a predetermined threshold value.

Such electrovalves lead to relatively complex and expensive structures which are poorly suited to portable machines.

An object of the invention is to solve those problems by providing a valve of the above-mentioned type which enables the risks of injury resulting from a momentary drop in the pressure of the fluid to be limited, and which has a simple structure and a reduced cost.

SUMMARY OF THE INVENTION

To that end, the invention relates to a machine comprising a circuit for supplying pressurised fluid, wherein the circuit comprises a safety valve comprising a body and an obturator movable in the body between a closed position and an open position, the valve comprising displacement means for displacing the obturator towards the closed position when the pressure of the fluid supplying the machine is lower than a threshold value, and wherein the displacement means comprise:

a piston for maintaining the obturator in the open position, the piston being in contact with the pressurised fluid when the obturator is in the open position, and return means for returning the obturator towards the closed position.

a piston for driving the obturator towards the open position, the piston being in contact with the pressurised fluid when the obturator is in the open position, and return means for returning the obturator towards the closed position.

According to particular embodiments, the machine may comprise one or more of the following features, taken in isolation or in any technically possible combination:

the return means are suitable for generating a return force counterbalancing the force exerted on the piston by the fluid when the pressure of the fluid is equal to the threshold value, the return means comprise a spring for urging the piston counter to the action of the pressurised fluid on the piston, the valve comprises a control member accessible from outside the valve for controlling the displacement of the obturator towards the open position, the valve comprises a control member accessible from outside the valve for controlling the displacement of the obturator towards the closed position, the displacement means comprise a slide which carries the piston and to which the obturator is connected, the or each control member is carried by one end of the slide, the means for displacing the obturator are located in the body, the safety valve is located upstream of the means consuming pressurised fluid, and wherein the piston for driving the obturator is, when the obturator is in the open position, in contact with the pressurised fluid upstream of the means consuming pressurised fluid, and the machine constitutes a machining machine.

BRIEF DESCRIPTION OF DRAWINGS

The invention will be better understood on reading the following description which is given purely by way of example and with reference to the appended drawings in which.

DESCRIPTION OF PREFERRED EMBODIMENT

Figure 1:
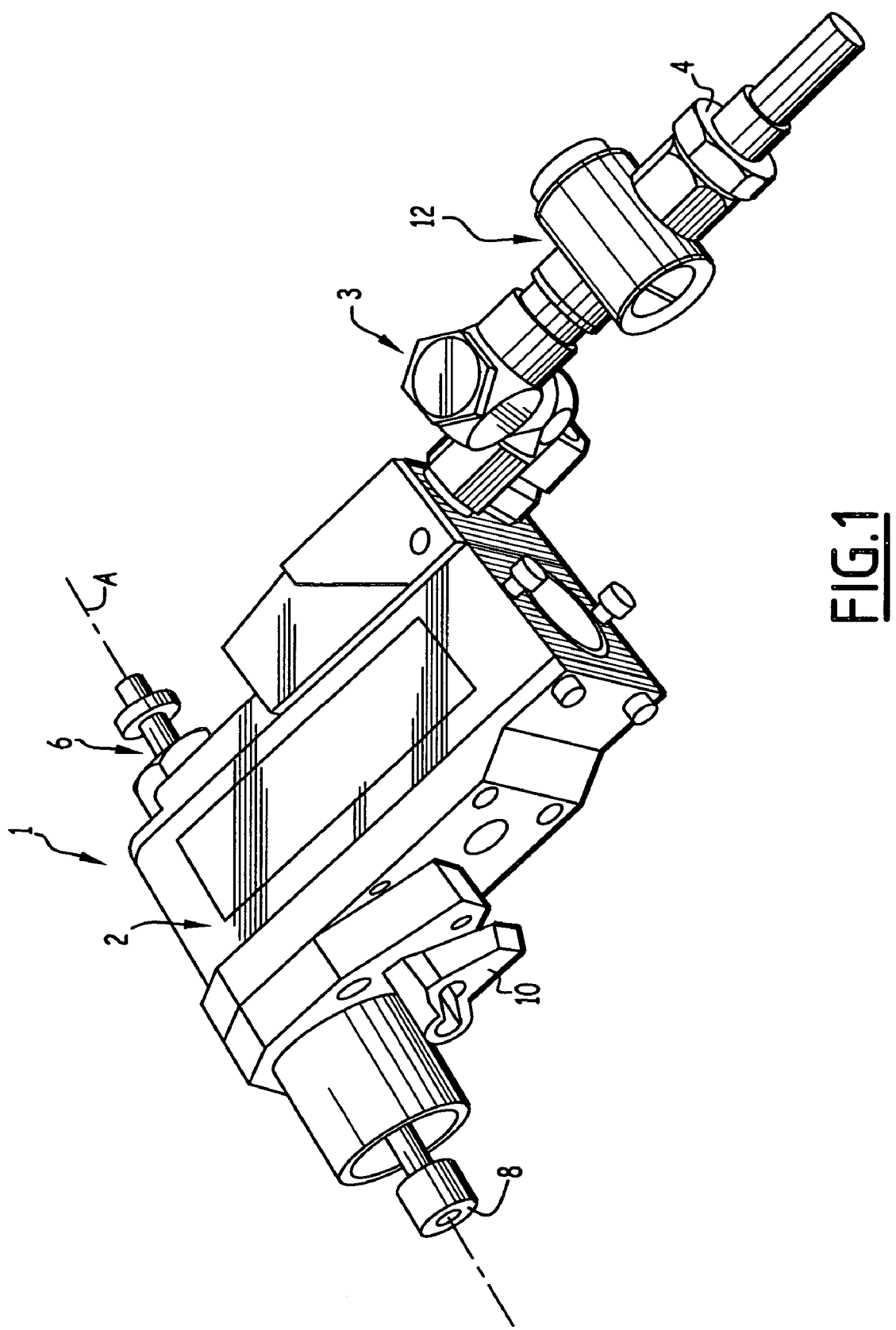
FIG. 1 is a diagrammatic perspective view of a machining machine according to the invention.

FIG. 1 illustrates a portable pneumatic drilling machine 1 which conventionally comprises:

a casing 2 containing a pneumatic motor, a circuit 3 for supplying the pneumatic motor with compressed air, the circuit 3 comprising a connector 4 which is to be connected, for example, via a tube, to a source of compressed air (not shown), a tool-holder spindle 6, and a mechanism (not shown) for driving the spindle 6.

Conventionally, drilling tools may be mounted removably at the front end 8 of the spindle.

The drive mechanism is a mechanism enabling the movement of the output shaft of the pneumatic motor to be converted into translational movements of the spindle 6 along its axis A and into rotational movements about that axis A. It may, for example, be a conventional mechanism which in French is generally called a "mécanisme d'avance mécanique" (mechanical advance mechanism) and in English a "positive feed drill".

Such a mechanism is described, for example, in document U.S. Pat. No. 5,351,797 which is incorporated herein by reference.

The machine 1 comprises a trigger 10 for activating the operation of the pneumatic motor.

The supply circuit 3 comprises a safety valve 12 downstream of the connector 4.

Figure 2:
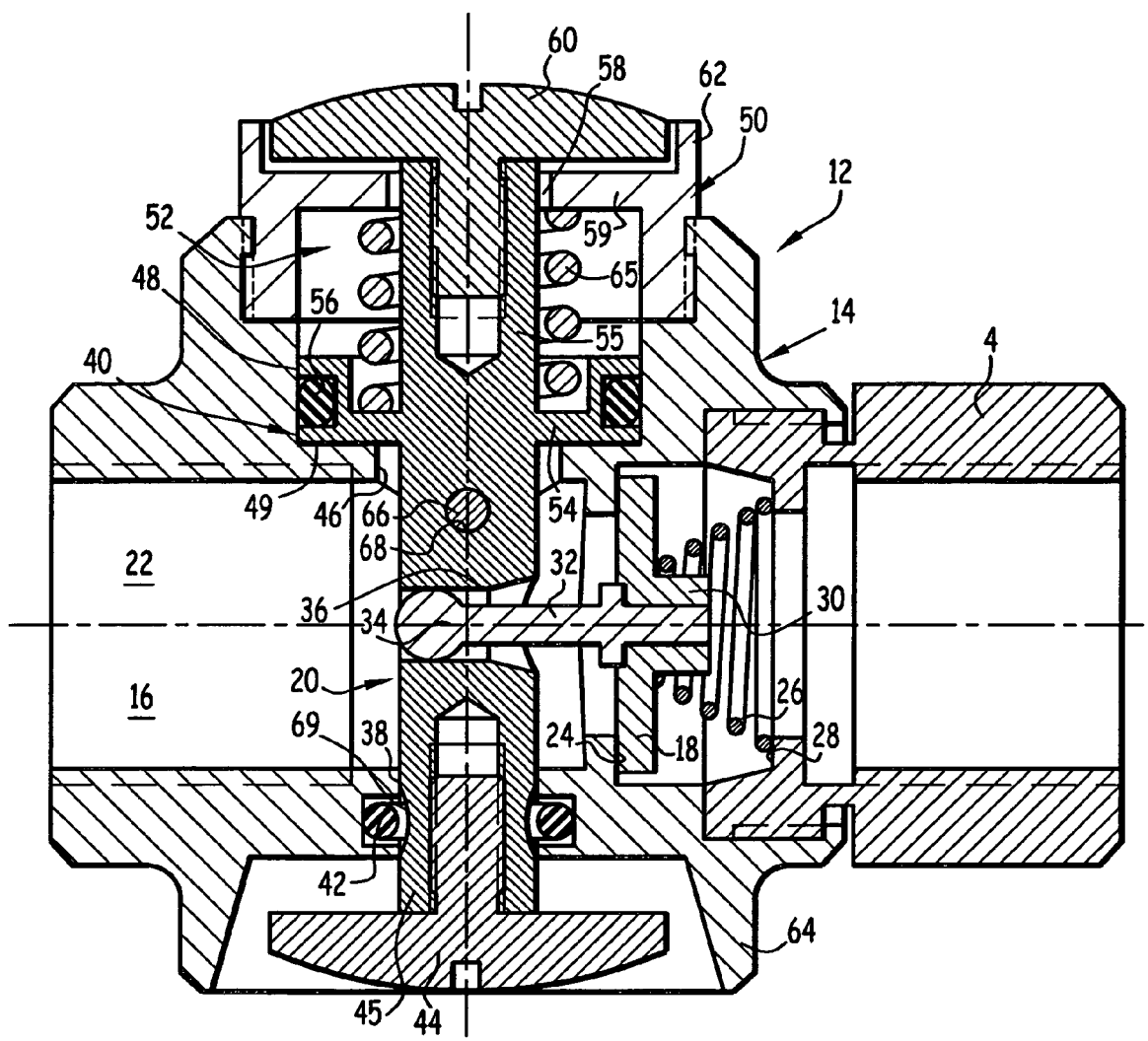
FIG. 2 is a diagrammatic view in longitudinal section of the safety valve of the machine of FIG. 1, the obturator of the valve being in the closed position.
Figure 3:
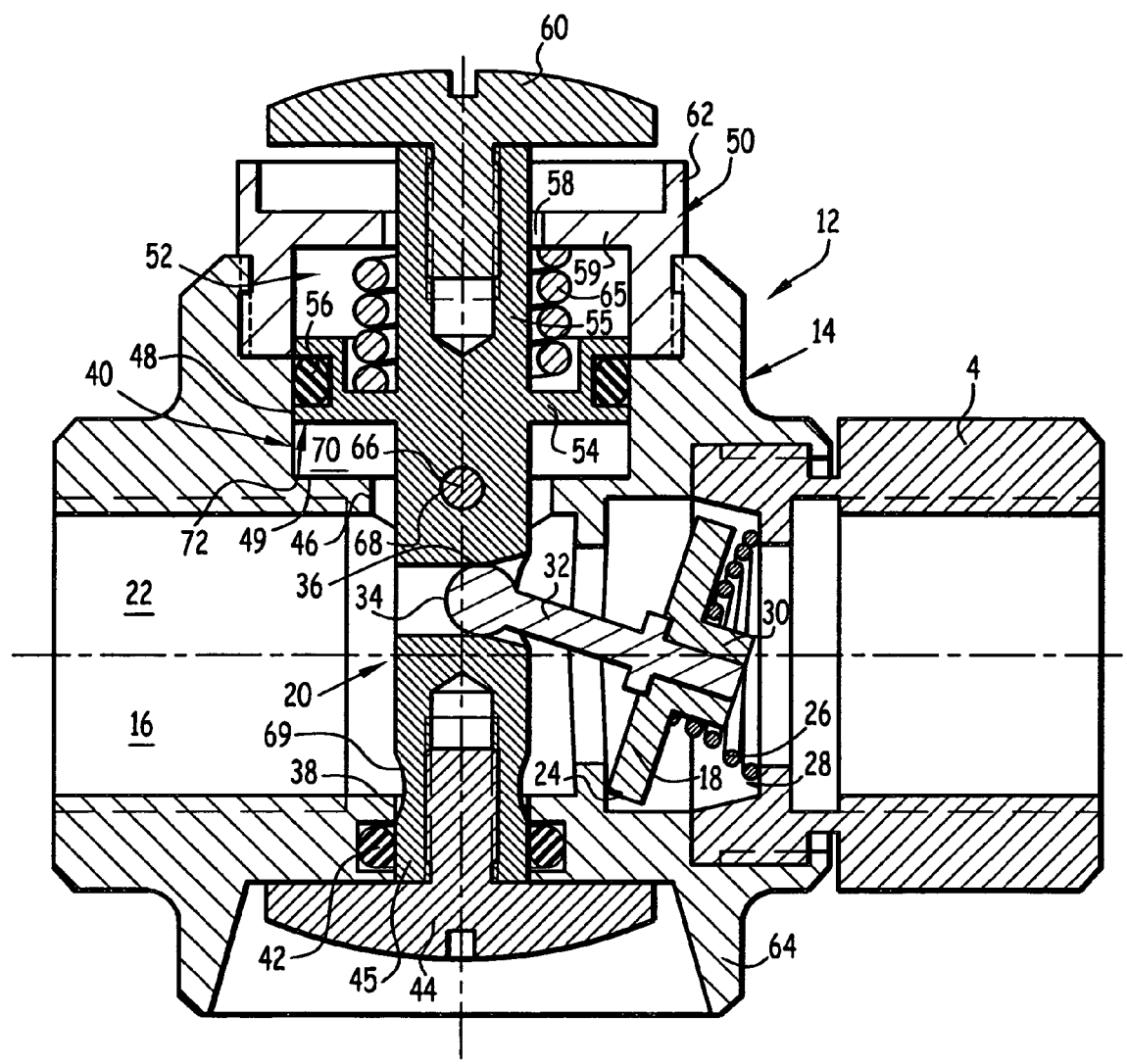
FIG. 3 is a view analogous to FIG. 2, the obturator being in the open position.

As illustrated more especially by FIGS. 2 and 3, the valve 12 principally comprises:
- a body 14 traversed by a longitudinal passage 16,
- an obturator 18, and
- a transverse slide 20 for displacing the obturator 18.

The connector 4 is received in the upstream end of the passage 16 and is secured to the body 14, for example by screwing. The connector 4 is hollow and communicates with the passage 16 to form a channel 22 for the flow of compressed air.

The downstream end of the passage 16 is threaded to enable the valve 12 to be secured to the rest of the machine 1 and to ensure that the channel 22 is brought into communication with the rest of the supply circuit 3.

The body 14 comprises an annular shoulder 24 which forms inside the channel 22 a seat for the obturator 18.

The obturator 18 is, for example, substantially in the shape of a disc. It tilts relative to the seat 24 between a first, closed, position illustrated by FIG. 2 and a second, open, position illustrated by FIG. 3.

In the closed position of FIG. 2, the obturator 18 bears against the seat 24 and closes the channel 22 so that the supply of compressed air to the pneumatic motor is prevented.

In the open position of FIG. 3, the obturator 18 has tilted in the clockwise direction in FIG. 3 relative to its lower edge, thus moving its upper edge away from the seat 24. The channel 22 is therefore no longer closed and the compressed air can then pass through it to supply the pneumatic motor of the machine 1.

The valve 12 also comprises a spring 26 for returning the obturator 18 towards its closed position. The spring 26 bears upstream on an annular shoulder 28 provided inside the connector 4, and downstream on the obturator 18 around an upstream boss 30.

The obturator 18 is extended downstream, that is to say, towards the left in FIGS. 2 and 3, by a rod 32 for connection to the slide 20. The rod 32 is terminated by a ball 34 received in an opening 36 formed in an intermediate portion of the slide 20. It will be noted that the opening 36 is flared at its upstream end.

The slide 20 is in the form of a rod and extends through the body 14 by means of two openings, namely a lower opening 38 in FIGS. 2 and 3 and an upper opening 40 in those same Figures.

An O-ring seal 42 is located in the lower opening 38, between the body 14 and the slide 20.

A control button 44, located outside the body 14 and accessible from outside the valve 12, is screwed into the lower end 45 of the slide 20.

This button 44 is green to indicate that it controls the supply of compressed air to the machine 1, as will be described hereinafter.

The upper opening 40 is a stepped opening which comprises a narrow lower portion 46 surrounding the slide 20 at a short distance and a wider upper portion 48. An annular shoulder 49 connects the portions 46 and 48.

The valve 12 also comprises a cap 50 screwed onto the body 14 in order to delimit with the upper portion 48 of the opening 40 a cylinder 52 receiving a piston 54 which is integral with the upper end 55 of the slide 20. An O-ring seal 56 is located between the piston 54 and the wall of the upper portion 48 of the opening 40.

The upper end 55 of the slide 20 extends through an opening 58 provided in the base 59 of the cap 50. The opening 58 surrounds the end 55 at a short distance.

A control button 60 accessible from outside the valve 12 is screwed onto the upper end 55 of the slide 20. This button 60 is red to indicate that it controls the interruption of the supply to the machine 1, as will be described hereinafter.

It will be noted that the button 60 is surrounded by an annular flange 62 provided on the cap 50.

A flange 64 integral with the body 14 surrounds the lower button 44 to prevent inadvertent manipulation of the button 44.

A spring 65 is located in the cylinder 52 around the end 55 of the slide 20. The spring 65 bears on the base 59 of the cap 50 and on the piston 54.

A transverse rod 66 is received in an opening 68 formed in the intermediate portion of the slide 20, above the opening 36. The rod 66 extends laterally relative to the slide 20 to be received in a vertical guide slot (not shown) formed in a lateral wall of the body 14. The rod 66 participates in guiding the slide 20 during the displacement thereof, which will now be described.

The slide 20 is movable in translation relative to the body 14 between two end positions or limit-of-travel positions, namely a first, lower, resting position illustrated by FIG. 2 and a second, upper, active position illustrated by FIG. 3.

In the resting position of FIG. 2, the piston 54 bears against the shoulder 49 of the opening 40. The chamber delimited below the piston 54 in the cylinder 52 therefore has a substantially zero volume.

The obturator 18 is then in the closed position. The resting position of the slide 20 is therefore a position for the interruption of the supply of compressed air.

It will be noted that the compressed air located upstream of the obturator 18 acts on the latter to place it against the seat 24 and thus holds it in its closed position, regardless of the pressure of the compressed air, so that the resting position of the slide 20 is a stable position. The lower button 44 is then in the outer position and the upper button 60 is in the pushed-in position.

A recess 69 formed in the lower end 45 of the slide 20 then forms a vent permitting ventilation of the channel 22 downstream of the obturator 18.

In the active position illustrated by FIG. 3, the slide 20 has been manually displaced upwards relative to its resting position in FIG. 2. The slide 20 has carried along with it the ball 34, thus causing the obturator 18 to tilt into its open position against the action of the spring 26. The active position of the slide 20 is therefore a position for the supply of compressed air. The seal 42 ensures sealing between the lower end 45 of the slide 20 and the body 14.

The piston 54 has therefore been displaced upwards in the cylinder 52, thus increasing the volume of the chamber 70 situated in the cylinder 52 beneath the piston 54. The chamber 70 communicates, via the lower portion 46 of the opening 40, with the channel 22, so that the compressed air of the source is in contact with all of the surface of the lower wall 72 of the piston 54.

The spring 65 has been compressed between the piston 54 and the base 59 of the cap 50 and thus tends to urge the slide 20 back towards its resting position.

The spring 65 is calibrated to counterbalance the force exerted on the piston 54 by air present in the chamber 70 and having a pressure equal to a predetermined threshold value.

Thus, when the slide 20 is in the supply position, as in FIG. 3, and if the pressure of the compressed air in the channel 22 passes below the threshold value, the spring 65 drives the slide 20 via the piston 54 towards its supply interruption position. The slide 20 then displaces the obturator 18 towards its closed position. The slide 20 and the obturator 18 thus come back to their positions illustrated by FIG. 2. It will be noted that the spring 26 is not sufficiently powerful by itself to bring back the obturator 18 into its closed position.

If there is then an inadvertent rise in pressure, the pressurised air upstream of the obturator 18 holds it in its closed position and the pneumatic motor is not supplied with compressed air.

Thus, inadvertent restarting of the drive of the spindle 6 is not possible.

In order to be able to use the machine 1 again, it is necessary to press the button 44 upwards to bring the slide 20 towards its supply position and therefore the obturator 18 towards its open position. If the pressure of the compressed air is sufficient, this position of the slide 20 is a stable position. The force exerted by the compressed air on the piston 54 is then greater than the return force exerted by the spring 65.

If it is desired to interrupt the supply to the machine 1 during the operation thereof, it is possible to press the button 60 to bring the slide 20/obturator 18 assembly into its position in FIG. 2.

Thus the valve 12 automatically brings about the interruption of the supply if the pressure of the supply air falls below a threshold value, and makes necessary a voluntary action on the part of the operator in order to re-establish the supply.

In a variant which is not represented, the valve 12 may comprise means for adjusting the return force of the spring 65 in order to modify the threshold pressure value. Such adjusting means comprise, for example, a screw.

The risks of injury to an operator by bringing the machine 1 inadvertently into operation again are therefore reduced.

Furthermore, the valve 12 has a simple structure and a small space requirement and cost, in particular because it does not introduce electrical means to drive the displacement of the obturator 18 and because the means for displacing the obturator 18, which are formed by the slide 20, the piston 54 and the spring 65, are integrated in the valve and, more precisely, they are accommodated in its body 14.

It will also be noted that the valve 12 may be integrated very readily in already existing machines 1.

More generally, a valve such as described above may be used to equip machining machines other than drilling machines, but also to equip machines, other than machining machines, that consume pressurised fluid.

It is particularly suitable for equipping portable machines, that is to say, having a mass of less than 15 kg.

Here the term machine extends, for example, to systems comprising one or more actuators.

The invention claimed is:

1. A machine comprising a circuit for supplying pressurized fluid, said circuit comprises a safety valve comprising: a body; an obturator movable in the body between a closed position and an open position; displacement means for displacing the obturator towards the closed position when the pressure of the fluid supplying the machine is lower than a threshold value, said displacement means comprise a piston for maintaining the obturator in the open position, the piston being in contact with the pressurized fluid supplying the machine downstream of the obturator when the obturator is in the open position, return means for returning the obturator towards the closed position, and a slide which carries the piston, the obturator being separate from the slide and movable with the slide, wherein the obturator is tiltable in the body between the closed and open positions, and wherein the return means generates a return force counterbalancing the force exerted on the piston by the fluid when the pressure of the fluid is equal to the threshold value.

2. The machine according to claim 1, wherein the return means comprise a spring for urging the piston counter to the action of the pressurised fluid on the piston.

3. The machine according to claim 1, wherein the valve comprises a control member accessible from outside the valve for controlling the displacement of the obturator towards the open position.

4. The machine according to claim 1, wherein the valve comprises a control member accessible from outside the valve for controlling the displacement of the obturator towards the closed position.

5. The machine according to claim 1, wherein the obturator is connected to the slide.

6. The machine according to claim 5, wherein the means for displacing the obturator are located in the body.

7. The machine according to claim 1, wherein the obturator is connected to the slide, the or each control member being carried by one end of the slide.

8. The machine according to claim 7, wherein the means for displacing the obturator are located in the body.

9. The machine according to claim 1, further comprising means consuming pressurized fluid, wherein the safety valve is located upstream of the means consuming pressurized fluid, and wherein the piston for driving the obturator is, when the obturator is in the open position, in contact with the pressurized fluid upstream of the means consuming pressurized fluid.

10. The machine according to claim 1, wherein the obturator is articulated to the slide.

* * * * *